US011418534B2

(12) United States Patent
Sugimoto et al.

(10) Patent No.: US 11,418,534 B2
(45) Date of Patent: Aug. 16, 2022

(54) THREAT ANALYSIS SYSTEM AND THREAT ANALYSIS METHOD

(71) Applicant: HITACHI, LTD., Tokyo (JP)

(72) Inventors: Akihiro Sugimoto, Tokyo (JP); Yoshiaki Isobe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 230 days.

(21) Appl. No.: 16/971,331

(22) PCT Filed: Feb. 22, 2019

(86) PCT No.: PCT/JP2019/006925
§ 371 (c)(1),
(2) Date: Aug. 20, 2020

(87) PCT Pub. No.: WO2019/163972
PCT Pub. Date: Aug. 29, 2019

(65) Prior Publication Data
US 2021/0029153 A1 Jan. 28, 2021

(30) Foreign Application Priority Data
Feb. 23, 2018 (JP) .............................. JP2018-031377

(51) Int. Cl.
H04L 9/40 (2022.01)
G06N 7/00 (2006.01)

(52) U.S. Cl.
CPC ......... H04L 63/1433 (2013.01); G06N 7/005 (2013.01); H04L 63/1441 (2013.01)

(58) Field of Classification Search
CPC . H04L 63/1433; H04L 63/1441; G06N 7/005; G06F 2221/034; G06F 21/577
See application file for complete search history.

(56) References Cited

U.S. PATENT DOCUMENTS

| 10,387,657 | B2* | 8/2019 | Belfiore, Jr. .......... G06F 21/577 |
| 10,521,584 | B1* | 12/2019 | Sharifi Mehr ...... H04L 63/1433 |
| 2014/0137257 | A1* | 5/2014 | Martinez ............. H04L 63/1433 726/25 |

(Continued)

FOREIGN PATENT DOCUMENTS

JP 2007-058514 A 3/2007

OTHER PUBLICATIONS

International Search Report of PCT/JP2019/006925 dated Apr. 2, 2019.

Primary Examiner — Beemnet W Dada
(74) Attorney, Agent, or Firm — Mattingly & Malur, PC

(57) ABSTRACT

A threat analysis system includes a storage unit that stores first information in which a device configuring a threat analysis target system and a vulnerability included in the device are associated with each other, and second information in which the device and a threat from a viewpoint of a business operator assumed in the threat analysis target system are associated with each other; a threat analysis processing unit that associates the vulnerability included in the device and a threat in the threat analysis target system with each other on a basis of the first information and the second information stored in the storage unit; and a threat-analysis result output unit that outputs a relationship between the vulnerability and the threat associated by the threat analysis processing unit.

6 Claims, 13 Drawing Sheets

(56) References Cited

U.S. PATENT DOCUMENTS

| | | | |
|---|---|---|---|
| 2014/0157417 A1* | 6/2014 | Grubel | H04L 63/20 726/25 |
| 2014/0245449 A1* | 8/2014 | Powell | H04L 63/1433 726/25 |
| 2018/0146004 A1* | 5/2018 | Belfiore, Jr. | G06F 21/577 |
| 2019/0205542 A1* | 7/2019 | Kao | G06F 8/70 |

* cited by examiner

FIG. 9

VULNERABILITY DETECTION RESULT TABLE — 801

| ITEM NO. | ITEM | OUTLINE |
|---|---|---|
| 901 | DEVICE ID | IDENTIFIER UNIQUELY ASSIGNED TO DEVICE |
| 902 | VULNERABILITY ID | ID OF VULNERABILITY POSSESSED BY DEVICE REPRESENTED BY CORRESPONDING DEVICE ID 901 |
| 903 | OTHER DEVICE INFORMATION | INFORMATION REGARDING DEVICE SUCH AS DEVICE NAME |

FIG. 10

VULNERABILITY INFORMATION TABLE — 802

| ITEM NO. | ITEM | OUTLINE |
|---|---|---|
| 1001 | VULNERABILITY ID | IDENTIFIER UNIQUELY ASSIGNED TO VULNERABILITY |
| 1002 | VULNERABILITY TYPE | TYPE OF VULNERABILITY |
| 1003 | ATTACK EASINESS | PROBABILITY OF OCCURRENCE OR SCORE OF ATTACK AIMING AT VULNERABILITY |
| 1004 | OTHER VULNERABILITY INFORMATION | INFORMATION REGARDING VULNERABILITY SUCH AS OUTLINE OF VULNERABILITY |

FIG. 11

THREAT INFORMATION TABLE FROM VIEWPOINT OF BUSINESS OPERATOR (803)

| ITEM NO. | ITEM | OUTLINE |
|---|---|---|
| 1101 | THREAT ID | IDENTIFIER UNIQUELY ASSIGNED TO THREAT |
| 1102 | THREAT DEGREE | SCORE OF MAGNITUDE OF DAMAGE INCURRED WHEN THREAD OCCURS |
| 1103 | OTHER THREAT INFORMATION | INFORMATION REGARDING THREAD SUCH AS THREAT NAME |

FIG. 12

CONTROL OPERATION INFORMATION TABLE (804)

| ITEM NO. | ITEM | OUTLINE |
|---|---|---|
| 1201 | CONTROL OPERATION ID | IDENTIFIER UNIQUELY ASSIGNED TO CONTROL OPERATION |
| 1202 | THREAT ID | ID OF THREAT RELATED TO CORRESPONDING CONTROL OPERATION 1201 |
| 1203 | CONTROL OPERATION TYPE | TYPE OF CONTROL OPERATION |
| 1204 | START POINT DEVICE ID | ID OF DEVICE THAT PERFORMS/TRANSMITS CORRESPONDING CONTROL OPERATION 1201 |
| 1205 | END POINT DEVICE ID | ID OF DEVICE THAT RECEIVES CORRESPONDING CONTROL OPERATION 1201 |
| 1206 | OTHER CONTROL OPERATION INFORMATION | INFORMATION REGARDING CONTROL OPERATION SUCH AS CONTROL OPERATION NAME |

FIG. 13

VULNERABILITY/CONTROL OPERATION CORRESPONDENCE TABLE (805)

| ITEM NO. | ITEM | OUTLINE |
|---|---|---|
| 1301 | VULNERABILITY TYPE | TYPE OF VULNERABILITY |
| 1302 | CONTROL OPERATION TYPE | TYPE OF CONTROL OPERATION |
| 1303 | CONTROL OPERATION POINT | WHETHER DEVICE HAVING VULNERABILITY IS AT A START POINT OR AN END POINT OF CONTROL OPERATION |
| 1304 | VULNERABILITY INFLUENCE DEGREE | PROBABILITY OR SCORE OF BLOCKAGE OF CONTROL OPERATION WHEN VULNERABILITY IS ATTACHED |

FIG. 14

THREAT ANALYSIS RESULT TABLE (806)

| ITEM NO. | ITEM | OUTLINE |
|---|---|---|
| 1401 | DEVICE ID | IDENTIFIER UNIQUELY ASSIGNED TO DEVICE |
| 1402 | VULNERABILITY ID | ID POSSESSED BY DEVICE REPRESENTED BY CORRESPONDING DEVICE ID 1401 |
| 1403 | VULNERABILITY TYPE | TYPE OF VULNERABILITY |
| 1404 | LIST OF CONTROL OPERATION IDS | LIST OF IDS OF CONTROL OPERATIONS RELATED TO DETECTED VULNERABILITY |
| 1405 | LIST OF CONTROL OPERATION INFLUENCE DEGREES | LIST OF PROBABILITIES OR SCORES OF BLOCKAGES OF CONTROL OPERATION |
| 1406 | LIST OF THREAD IDS | LIST OF IDS OF THREATS RELATED TO DETECTED VULNERABILITY |
| 1407 | LIST OF THREAD INFLUENCE DEGREES | LIST OF PROBABILITIES OR SCORES OF OCCURRENCES OF THREAT |
| 1408 | SYSTEM INFLUENCE DEGREE | INFLUENCE DEGREE OF DETECTED VULNERABILITY ON ENTIRE SYSTEM |

THREAT ANALYSIS SYSTEM AND THREAT ANALYSIS METHOD

TECHNICAL FIELD

The present invention relates to a threat analysis system and a threat analysis method, and is preferable for application to, for example, a threat analysis system and a threat analysis method for analyzing a relationship between a vulnerability and a threat from a viewpoint of a business operator.

BACKGROUND

Generally, an IT (Information Technology) system is configured of various kinds of software. These various kinds of software have defects called software vulnerabilities such as program defects and specification problems, which may be discovered later. In fact, public security organizations have compiled a database of discovered software vulnerability information, and have provided warning about 5,000 software vulnerabilities a year.

On the other hand, it is known that immediately after the disclosure of vulnerability information, attacks using the same vulnerabilities by malicious attackers tend to increase remarkably. Therefore, a system administrator who operates an information system is required to sensitively react to the disclosed vulnerability information and make a quick response determination.

However, it is not easy to quickly deal with a large number of disclosed vulnerabilities. In dealing with the vulnerabilities, it is necessary for the system administrator to check the vulnerability information that is disclosed on a daily basis without exception, identify whether it is related to a system administered by himself or herself, and evaluate influence of the vulnerability, which takes a lot of man-hours and time.

Therefore, a technology for collecting system information and the vulnerability information, identifying the vulnerability inherent in the system, and evaluating a risk that the vulnerability poses to the system has been required. As a conventional technique for managing and evaluating such vulnerabilities of a system, for example, there has been proposed an information processor in which a plurality of keywords indicating characteristics of the vulnerabilities are stored in a product DB (database) and a vulnerability keyword DB, and a keyword extraction unit extracts a keyword matching the keyword accumulated in the product DB and the vulnerability keyword DB from the vulnerability information collected by a vulnerability-related information collecting unit, a priority determination unit determines a priority of the vulnerability information on the basis of a keyword extraction result in accordance with a content of a priority determination DB, and an output unit outputs a determination result of the priority (see PTL 1). In this technology, threat analysis is performed from product information and vulnerability information to improve efficiency of vulnerability countermeasures.

CITATION LIST

Patent Literature

PTL 1: JP 2007-058514 A

SUMMARY

Technical Problem

In the related art, by associating the vulnerability information and the product information with each other on the basis of the keyword, it is possible to identify the vulnerability related to the system to be administered from a vast amount of vulnerability information. In addition, by analyzing technical aspects of vulnerabilities, it is possible to analyze threats for each device configuring the system.

However, in recent years, medical devices, infrastructure devices, or the like are often connected to IT systems via the Internet, and it has become insufficient to analyze threats for each device. It is because since medical devices and the like are those that can affect a human body, threats from a viewpoint of a business operator, such as adverse effects on the human body, are more significant as security requirements than threats that occur in each of the devices, such as a device shutdown and information leakage from the devices.

The present invention has been made in view of the above points, and an object thereof is to propose a threat analysis system and a threat analysis method that enable threat analysis more suitable for a security requirement of a system.

Solution to Problem

In order to solve such a problem, in the present invention, a threat analysis system includes a storage unit that stores first information in which a device configuring a threat analysis target system and a vulnerability included in the device are associated with each other, and second information in which the device and a threat from a viewpoint of a business operator assumed in the threat analysis target system are associated with each other; a threat analysis processing unit that associates the vulnerability included in the device and a threat in the threat analysis target system with each other on a basis of the first information and the second information stored in the storage unit; and a threat-analysis result output unit that outputs a relationship between the vulnerability and the threat associated by the threat analysis processing unit.

Moreover, in the present invention, a threat analysis method is an analysis method in a threat analysis system having a storage unit that stores first information in which a device configuring a threat analysis target system and a vulnerability included in the device are associated with each other, and second information in which the device and a threat from a viewpoint of a business operator assumed in the threat analysis target system are associated with each other, the analysis method including: a first step in which a threat analysis processing unit associates the vulnerability included in the device and a threat in the threat analysis target system with each other on a basis of the first information and the second information stored in the storage unit; and a second step in which a threat-analysis result output unit outputs a relationship between the vulnerability and the threat associated by the threat analysis processing unit.

According to the above configuration, it is possible to analyze the relationship between the vulnerability and the threat from the viewpoint of the business operator.

Advantageous Effects of Invention

According to the present invention, it is possible to perform threat analysis more suitable for a security requirement of a system.

BRIEF DESCRIPTION OF DRAWINGS

FIG. 9 is a diagram showing an example of a vulnerability detection result table according to the first embodiment.

FIG. 10 is a diagram showing an example of a vulnerability information table according to the first embodiment.

FIG. 11 is a diagram showing an example of a threat information table according to the first embodiment.

FIG. 12 is a diagram showing an example of a control operation information table according to the first embodiment.

FIG. 13 is a diagram showing an example of a vulnerability/control operation correspondence table according to the first embodiment.

FIG. 14 is a diagram showing an example of a threat analysis result table according to the first embodiment.

DESCRIPTION OF EMBODIMENTS

Hereinafter, one embodiment of the present invention will be described in detail with reference to the drawings.

(1) First Embodiment

Figure 1:
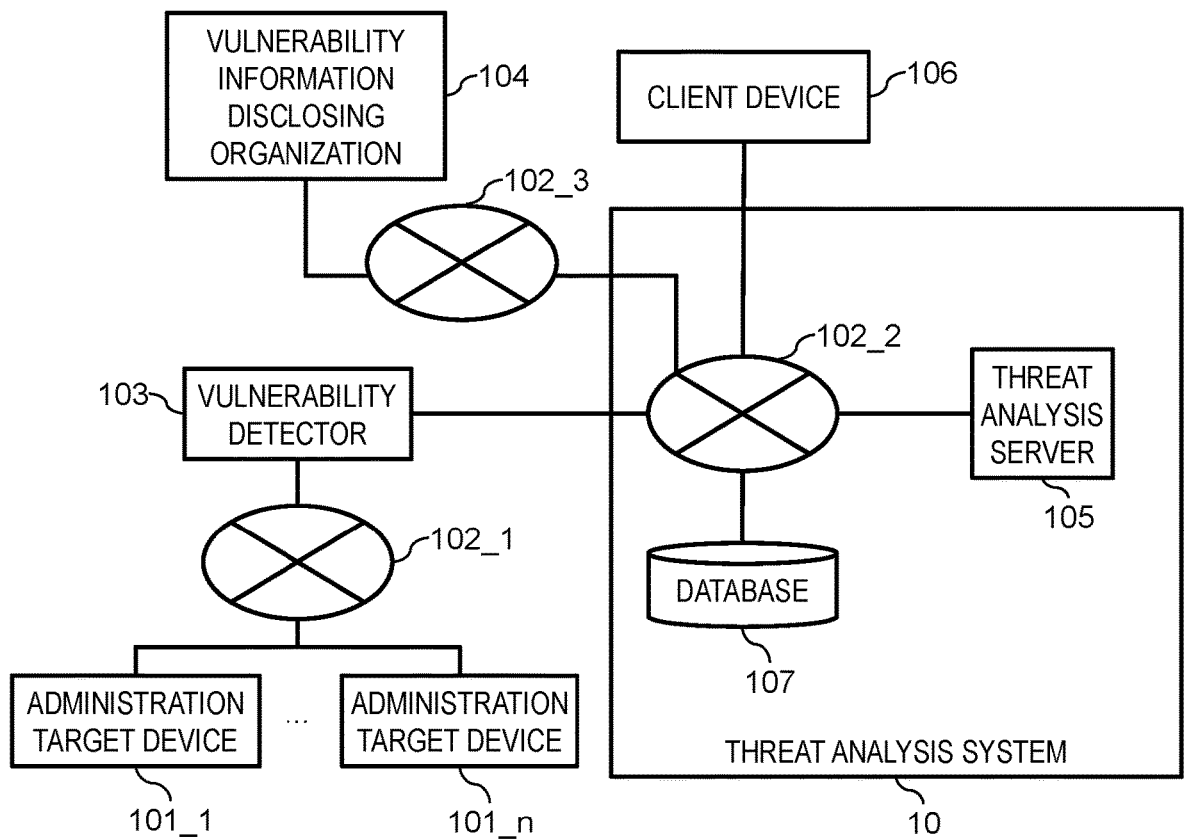
FIG. 1 is a diagram showing an example of a configuration related to a threat analysis system according to a first embodiment.

In FIG. 1, reference sign 10 denotes a threat analysis system according to a first embodiment.

(System Configuration)

FIG. 1 is a diagram showing an example of a configuration according to the threat analysis system 10 of the present embodiment. The threat analysis system 10 is a computer system that analyzes a relationship between a vulnerability and a threat from a viewpoint of a business operator in addition to vulnerability information and information of a threat for each device caused by the vulnerability to enable threat analysis more suitable for a security requirement of a system.

The threat analysis system 10 includes a threat analysis server 105 and a database 107, and is communicatively connected to a vulnerability detector 103 that detects a vulnerability of an administration target devices 101 (administration target devices 101_1 to 101_n) via a network 102 (a network 102_1, a network 102_2, an internet 102_3, and the like), a vulnerability information disclosing organization 104, and a client device 106.

The administration target device 101 is a device that configures a system (threat analysis target system) administered by an administrator as a threat analysis target, and includes the one or plurality of administration target devices 101. In the present embodiment, an evaluation target is a risk caused by the vulnerability possessed by the administration target device 101.

The vulnerability detector 103 is a device that collects information about the target system of the threat analysis, that is, the administration target device 101 (system information, identification information and the like of each of the administration target devices 101), and detects the vulnerability possessed by the administration target device 101.

The vulnerability information disclosing organization 104 is a server device of a predetermined organization that discloses the vulnerability information on the internet 102_3. As an example of a management organization of the vulnerability information disclosing organization 104, a company that provides various security countermeasure services such as detection and countermeasures of computer viruses, an OS (Operating System) provider, and the like can be assumed. Such a management organization discloses the vulnerability information regarding information security obtained about a specific information processor, OS, or software through the vulnerability information disclosing organization 104.

The threat analysis server 105 is a server device that executes each procedure corresponding to a threat analysis method of the present embodiment on the basis of information on the database 107 and a request of the administrator received via the client device 106. The threat analysis server 105 may include a function (configuration) of the vulnerability detector 103.

The client device 106 is a general computer terminal that is directly operated by the administrator, and is a device that is a main output destination of a processing result by the threat analysis server 105, that is, a threat analysis result.

The database 107 is a storage that stores a vulnerability detection result derived by the vulnerability detector 103, the vulnerability information collected by the threat analysis server 105, the threat analysis result derived by the threat analysis server 105, and the like, and is communicatively connected to the threat analysis server 105 via the network 102-2. Note that the database 107 is also preferable as a configuration for being stored in an external storage 704 (see FIG. 7) of the threat analysis server 105.

The threat analysis system 10 can appropriately employ a configuration in which the threat analysis server 105 can access the database 107, and the threat analysis system 10 may or may not include the database 107. Moreover, the threat analysis system 10 may appropriately include devices other than the threat analysis server 105 (the vulnerability detector 103, the client device 106, and the like).

Note that the administration target device 101 and the vulnerability detector 103 are connected via the network 102_1, and the vulnerability information disclosing organization 104 and the threat analysis server 105 are connected via the internet 102_3. However, the networks 102_1, 102_3 are not essential, and the vulnerability detector 103 may be configured to read from a USB (Universal Serial Bus) and receive a user input operation from an appropriate interface to acquire data. Moreover, while the networks 102_1, 102_2, 102_3 are illustrated as different networks in the present embodiment, they may be the same network. As an additional note, each of the components denoted by reference signs in the configuration shown in FIG. 1 may be plural, depending on an embodiment.

(Functional Configuration)

Functions of the threat analysis system 10 will be described. Here, each of the functions implemented (realized) by not only the threat analysis server 105, but each device including, for example, the threat analysis system 10 executing an appropriate program included in a memory 703 or the external storage 704 (see FIG. 7) will be described.

Figure 2:
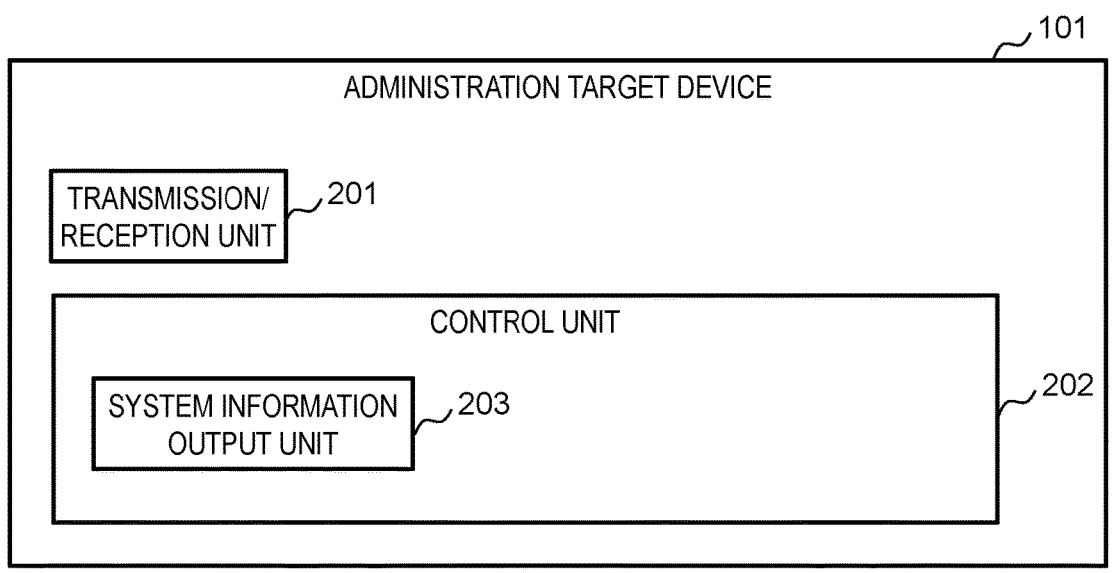
FIG. 2 is a diagram showing an example of a functional configuration of an administration target device according to the first embodiment.

FIG. 2 is a diagram showing an example of a functional configuration of the administration target device 101. The administration target device 101 includes a transmission/reception unit 201 and a control unit 202.

The transmission/reception unit 201 is a processing unit that transmits and receives information between the vulnerability detector 103 and itself via the network 102_1.

The control unit 202 includes a system information output unit 203. The system information output unit 203 is a processing unit that collects information regarding a device, such as an ID (identification) indicating identification information of the administration target device 101 and a device name, and transmits the collected information regarding the device to the vulnerability detector 103 via the transmission/reception unit 201.

For the information collection in the system information output unit 203, while a standard function of an OS in the administration target device 101 can be used, in addition, an information collection tool based on an inspection specification defined in a security inspection language (OVAL: Open Vulnerability and Assessment Language) or the like may be used, and a form is not limited.

Figure 3:
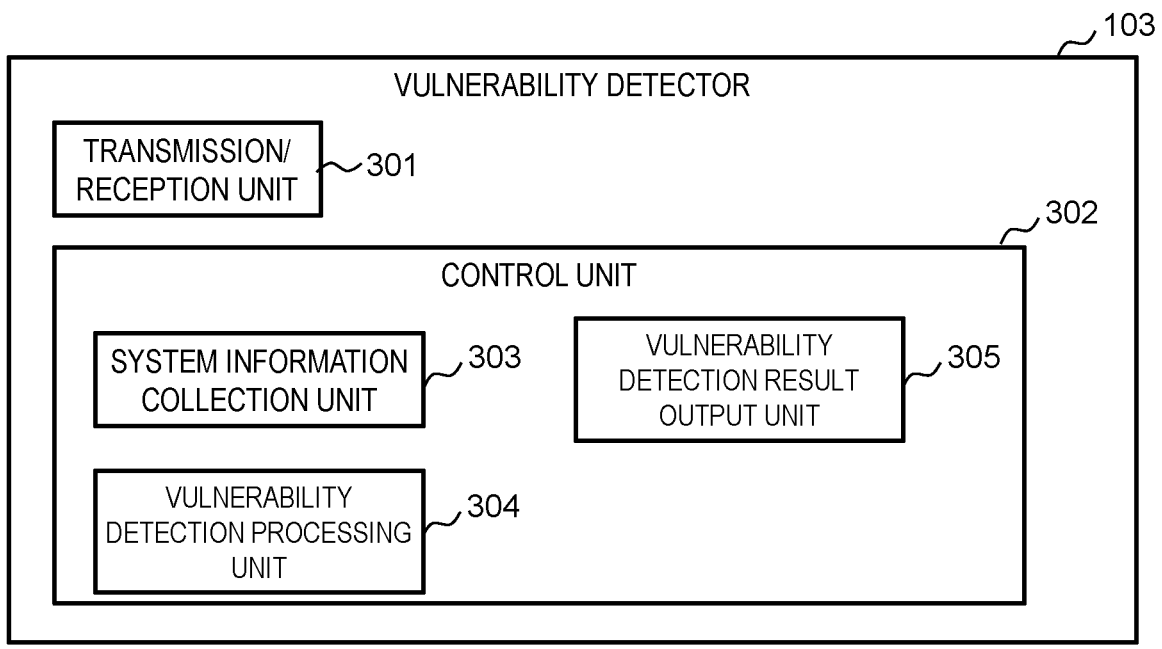
FIG. 3 is a diagram showing an example of a functional configuration of a vulnerability detector according to the first embodiment.

FIG. 3 is a diagram showing an example of a functional configuration of the vulnerability detector 103. The vulnerability detector 103 includes a transmission/reception unit 301 and a control unit 302.

The transmission/reception unit 301 is a processing unit that transmits and receives information via the networks 102_1, 102_2.

Note that the control unit 302 includes a system information collecting unit 303, a vulnerability detection processing unit 304, and a vulnerability detection result output unit 305. The system information collecting unit 303 is a processing unit that receives the system information from the administration target device 101 via the transmission/reception unit 301. The vulnerability detection processing unit 304 is a processing unit that detects a vulnerability possessed by the relevant device on the basis of a predetermined algorithm. Note that as a method for detecting the vulnerability, a method of searching for a related vulnerability from software information possessed by the administration target device 101, a method of executing an inspection code on the administration target device 101, or the like may be used, and a form is not limited. The vulnerability detection result output unit 305 is a processing unit that transmits a processing result (the vulnerability detection result) of the vulnerability detection processing unit 304 to the threat analysis server 105 via the transmission/reception unit 301.

Figure 4:
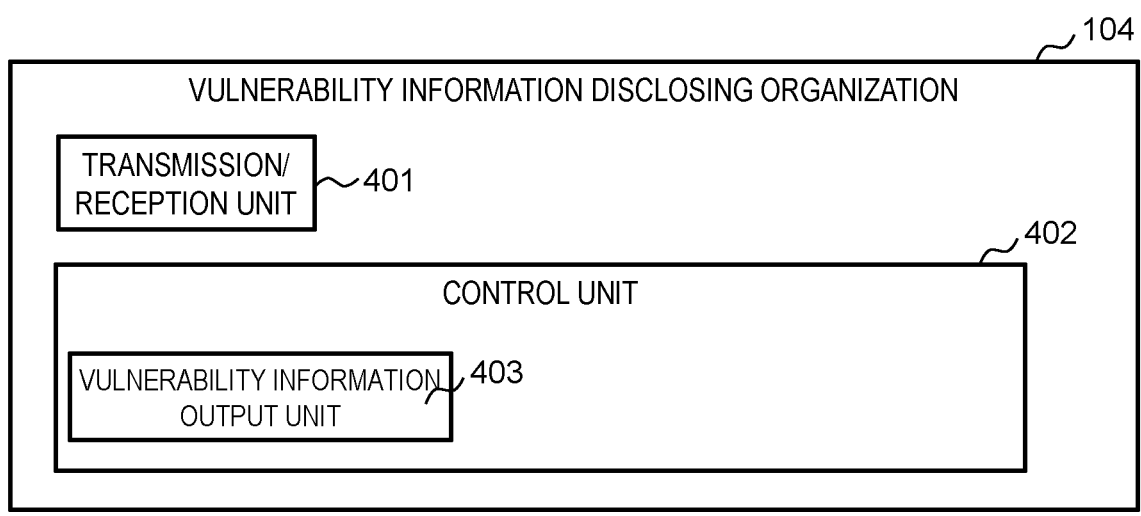
FIG. 4 is a diagram showing an example of a functional configuration of a vulnerability information disclosing organization according to the first embodiment.

FIG. 4 is a diagram showing an example of a functional configuration of the vulnerability information disclosing organization 104. The vulnerability information disclosing organization 104 includes a transmission/reception unit 401 and a control unit 402.

The transmission/reception unit 401 is a processing unit that transmits and receives information between the threat analysis server 105 and itself via the network 102_3.

The control unit 402 includes a vulnerability information output unit 403. The vulnerability information output unit 403 transmits the vulnerability information to the threat analysis server 105 via the transmission/reception unit 401. Methods for collection and management of the information in the vulnerability information disclosing organization 104 differ, depending on the specification of the vulnerability information disclosing organization 104, and a managing company and the like of the vulnerability information disclosing organization 104, and thus, are not particularly limited here. Moreover, while in the present embodiment, while an example is given in which the information is received from one (the same) vulnerability information disclosing organization 104, information may be received from different vulnerability information disclosing organizations 104, and a form is not limited.

Figure 5:
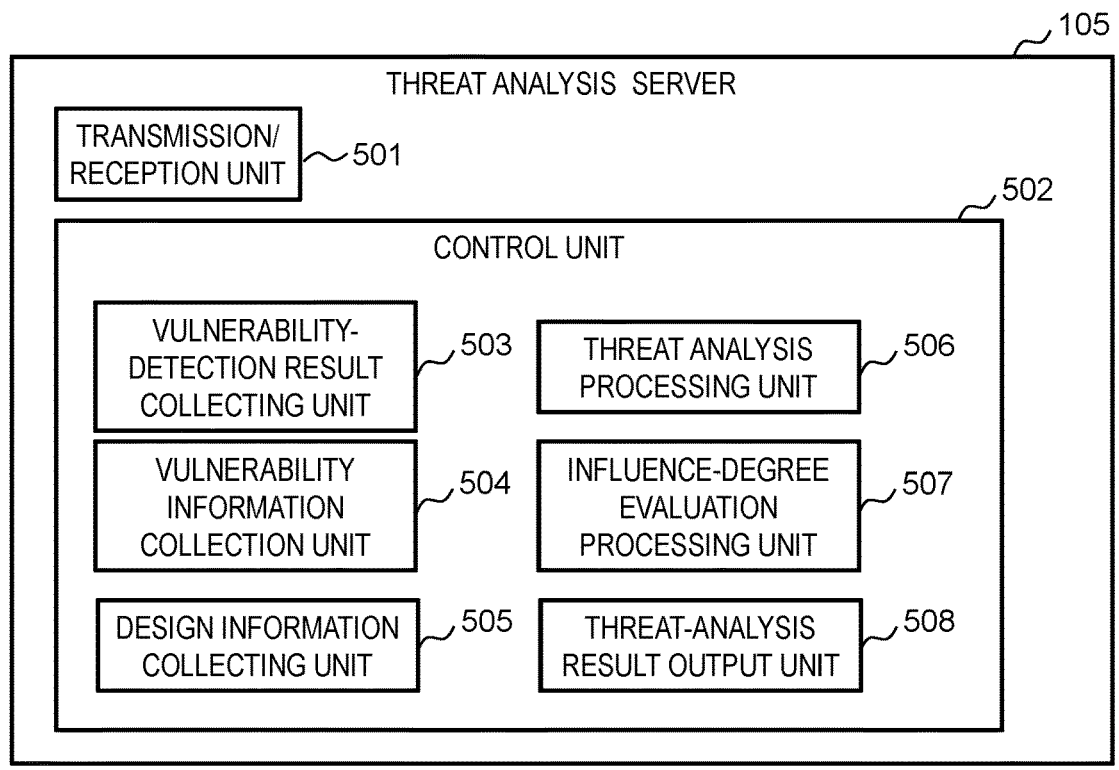
FIG. 5 is a diagram showing an example of a functional configuration of a threat analysis server according to the first embodiment.

FIG. 5 is a diagram showing an example of a functional configuration of the threat analysis server 105. The threat analysis server 105 includes a transmission/reception unit 501 and a control unit 502.

The transmission/reception unit 501 is a processing unit that transmits and receives information via the networks 102_2, 102_3.

The control unit 502 includes a vulnerability-detection result collecting unit 503, a vulnerability information collecting unit 504, a design information collecting unit 505, a threat analysis processing unit 506, an influence-degree evaluation processing unit 507, and a threat-analysis result output unit 508.

The vulnerability-detection result collecting unit 503 is a processing unit that receives the vulnerability detection result from the vulnerability detector 103 via the transmission/reception unit 501 and stores the received vulnerability detection result in the database 107.

The vulnerability information collecting unit 504 is a processing unit that receives the vulnerability information from the vulnerability information disclosing organization 104 via the transmission/reception unit 501 and stores the received vulnerability information in the database 107.

The design information collecting unit 505 is a processing unit that receives design information from the client device 106 via the transmission/reception unit 501 and stores the received design information in the database 107.

The threat analysis processing unit 506 is a processing unit that uses the information on the database 107 to analyze, for example, whether the vulnerability possessed by the administration target device 101 is related to a threat from a viewpoint of the business operator defined in the design information.

As an additional note, the threat analysis processing unit 506 associates the vulnerability included in the device and the threat in the threat analysis target system with each other, for example, on the basis of first information in which the device configuring the threat analysis target system (e.g., the administration target device 101) and the vulnerability included in the device (e.g., a device ID 901 and a vulnerability ID 902 in a vulnerability detection result table 801 described later) are associated with each other, and second information in which the device and the threat from the viewpoint of the business operator assumed in the threat analysis target system (e.g., a threat ID 1202, and a start point device ID 1204 and/or an end point device ID 1205 in a control operation information table 804 described later) are associated with each other, the first information and the second information being stored in the storage unit (e.g., the database 107). Moreover, for example, the threat analysis processing unit 506 further associates a control operation having a vulnerability influence degree of a predetermined value (e.g., a value larger than 0%), the vulnerability influence degree being corresponding to a type of the vulnerability included in the device, and a type of the control operation related to the device on the basis of third information in which the type of the vulnerability included in the device, the type of the control operation related to the device, and the vulnerability influence degree of the vulnerability on the control operation are associated with one another, the third information being stored in the storage unit (e.g., a vulnerability type 1301, a control operation type 1302, and a vulnerability influence degree 1304 in a vulnerability/control operation correspondence table 805 described later).

The influence-degree evaluation processing unit 507 is a processing unit that calculates, from the result of the threat analysis derived by the threat analysis processing unit 506, for example, a magnitude of the influence that the vulnerability possessed by the administration target device 101 has on the threat from the viewpoint of the business operator defined in the design information. As an additional note, the influence-degree evaluation processing unit 507 evaluates the magnitude of the influence of the vulnerability included in the device (e.g., the administration target device 101) on the threat in the threat analysis target system, using, for example, a predetermined algorithm (e.g., a Bayesian network).

The threat-analysis result output unit 508 is a processing unit that transmits the threat analysis result derived by the threat analysis processing unit 506 and the influence-degree evaluation processing unit 507 to the client device 106 via the transmission/reception unit 501.

Details of the processing by each of the functional units in the threat analysis server 105 will be described later with reference to FIGS. 19 and 20.

Figure 6:
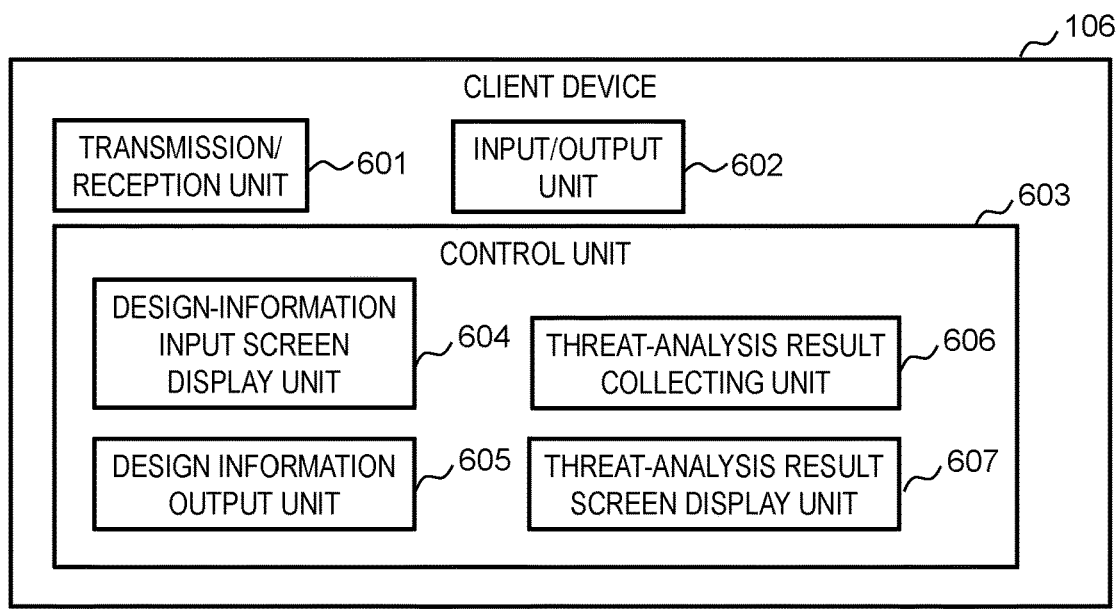
FIG. 6 is a diagram showing an example of a functional configuration of a client device according to the first embodiment.

FIG. 6 is a diagram showing an example of a functional configuration of the client device 106. The client device 106 includes a transmission/reception unit 601, an input/output unit 602, and a control unit 603.

The transmission/reception unit 601 is a processing unit that transmits/receives information via the network 102_2.

The input/output unit 602 is a processing unit that controls an input from the user such as the system administrator via an interface device such as a keyboard or a pointing device, and controls output processing for the user through an interface device such as a monitor.

The control unit 603 includes a design-information input screen display unit 604, a design information output unit 605, a threat-analysis result collecting unit 606, and a threat-analysis result screen display unit 607. The design-information input screen display unit 604 is a processing unit that displays a screen for information input to the user via the input/output unit 602, and accepts an input of design information of the threat analysis target system. The design information output unit 605 is a processing unit that transmits the design information accepted by the design-information input screen display unit 604 to the threat analysis server 105 via the transmission/reception unit 601. The threat-analysis result collecting unit 606 is a processing unit that receives the threat analysis result from the threat analysis server 105 via the transmission/reception unit 601. The threat-analysis result screen display unit 607 is a processing unit that displays the threat analysis result received by the threat-analysis result collecting unit 606 to the user via the input/output unit 602.

(Hardware Configuration)

Figure 7:
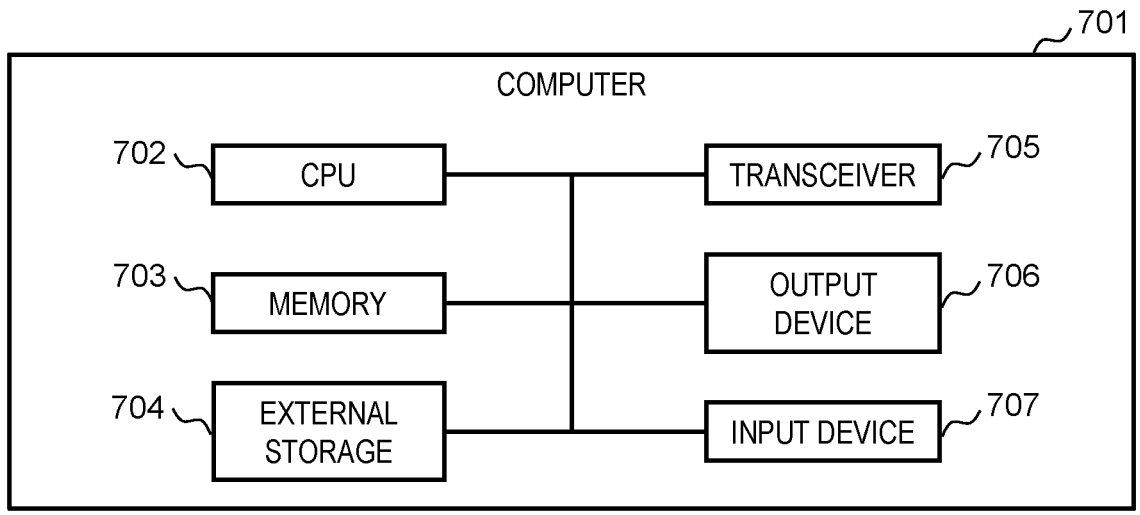
FIG. 7 is a diagram showing an example of a hardware configuration of a computer according to the first embodiment.

FIG. 7 is a diagram showing an example of a hardware configuration of a computer 701. Each of the administration target device 101, the vulnerability detector 103, the vulnerability information disclosing organization 104, and the threat analysis server 105 is configured by a computer 701.

The computer 701 includes a CPU 702 (Central Processing Unit), the memory 703 configured of a volatile storage element such as a RAM (Random Access Memory), the external storage 704 configured of an appropriate nonvolatile storage element such as an SSD (Solid State Drive) or a hard disk drive, a transceiver 705 such as a network interface card (NIC), an output device 706 such as a display, and an input device 707 such as a pointing device or a keyboard.

Any of the administration target device 101, the vulnerability detector 103, the vulnerability information disclosing organization 104, and the threat analysis server 105 may not include the output device 706 and the input device 707.

Moreover, the control units 202, 302, 402, 502, 603, the transmission/reception units 201, 301, 401, 501, 601, and the input/output unit 602 of each of the devices illustrated in FIGS. 2 to 6 are implemented by the CPU 702 loading, on the memory 703, an appropriate program stored in the foregoing external storage 704 and executing the same program. Note that the transmission/reception units 201, 301, 401, 501, 601 may be implemented by the transceiver 705. Moreover, the input/output unit 602 may be implemented by the output device 706 and the input device 707.

(Data Configuration)

A configuration example of data used by the threat analysis server 105 will be described. The data used by the threat analysis server 105 includes at least vulnerability detection result information obtained by the vulnerability detector 103 detecting the vulnerability possessed by the administration target device 101, the vulnerability information disclosed by the vulnerability information disclosing organization 104, the design information of the threat analysis target system input by the user, and association information that is a rule for associating the vulnerability and the threat.

Figure 8:
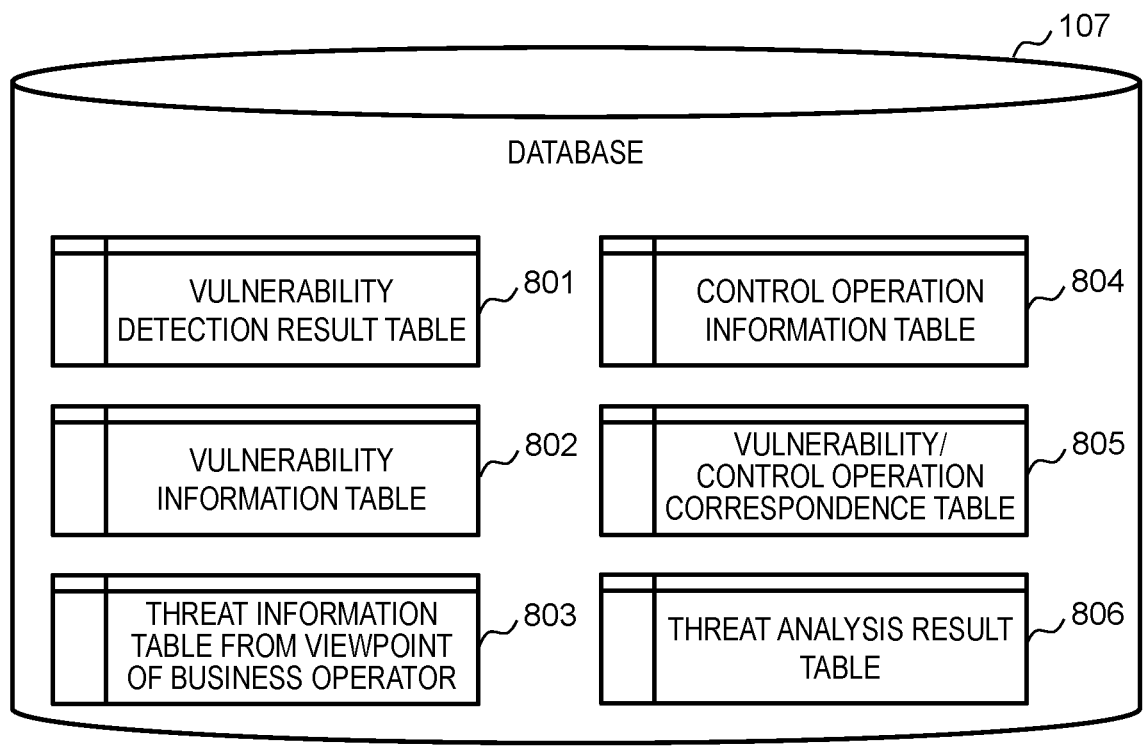
FIG. 8 is a diagram showing an example of data tables stored on a database according to the first embodiment.

FIG. 8 is a diagram showing an example of a data table stored in the database 107. The database 107 stores the vulnerability detection result table 801, a vulnerability information table 802, a threat information table from the viewpoint of the business operator 803, the control operation information table 804, the vulnerability/control operation correspondence table 805, a threat analysis result table 806, and the like. The tables are associated with one another by a predetermined ID included in each record or the like. Details of each of the tables will be described with reference to FIGS. 9 to 14.

FIG. 9 is a diagram showing an example of the vulnerability detection result table 801. In FIG. 9, the vulnerability detection result table 801 has the device ID 901, the vulnerability ID 902, and other device information 903 as data items.

The device ID 901 is an identifier uniquely assigned to the device. The vulnerability ID 902 is an ID of the vulnerability possessed by the device represented by the corresponding device ID 901. In the example of FIG. 9, a possession relationship between the device and the vulnerability is managed by a pair of the device ID 901 and the vulnerability ID 902. The other device information 903 is information about the device such as a device name. For example, in the case where the user sets a "railroad crossing control system" as the threat analysis target system, and a device named "railroad crossing controller" (an identifier of a device "DEV111") possesses a vulnerability "VUL-2017-0930", in the present embodiment, a record having "DEV111" in the device ID 901, "VUL-2017-0930" in the vulnerability ID 902, and "railroad crossing controller" in the other device information 903 is stored.

FIG. 10 is a diagram showing an example of the vulnerability information table 802. In FIG. 10, the vulnerability information table 802 has a vulnerability ID 1001, a vulnerability type 1002, an attack easiness 1003, and other vulnerability information 1004 as data items.

The vulnerability ID 1001 is an identifier uniquely assigned to the vulnerability. The vulnerability type 1002 is a type of vulnerability. Generally, the vulnerability information disclosing organization 104 discloses security information by assigning a type to each vulnerability on the basis of normal security standards such as CWE (Common Weakness Enumeration), and the same type can be used as the vulnerability type 1002. The attack easiness 1003 is a probability of occurrence or a score of an attack aiming at the vulnerability. Generally, the vulnerability information disclosing organization 104 discloses the security information by assigning, to each of the vulnerabilities, a score of the attack easiness, an influence degree on the device and the like from a viewpoint of technical characteristics on the basis of normal security standards such as CVSS (Common Vulnerability Scoring System), so that the same score can be used as the attack easiness 1003. The other vulnerability information 1004 is information regarding the vulnerability such as an outline of the vulnerability.

FIG. 11 is a diagram showing an example of the threat information table from the viewpoint of the business operator 803. In FIG. 11, the threat information table from the viewpoint of the business operator 803 has a threat ID 1101, a threat degree 1102, and other threat information 1103 as data items.

The threat ID 1101 is an identifier uniquely assigned to the threat. The threat degree 1102 is a score of a magnitude of damage incurred when the threat occurs. The other threat information 1103 is information regarding the threat such as the threat name. In the present embodiment, the threat information is information input by the user, and a form differs depending on a design method. For example, as the design method, STAMP/STPA (System Theoretic Accident Model and Processes/System Theoretic Process Analysis) may be used, and in that case, an "accident" defined in STAMP/STPA is the threat in the present embodiment.

FIG. 12 is a diagram showing an example of the control operation information table 804. In FIG. 12, the control operation information table 804 has a control operation ID 1201, a threat ID 1202, a control operation type 1203, the start point device ID 1204, the end point device ID 1205, and other control operation information 1206 as data items.

The control operation ID 1201 is an identifier uniquely assigned to the control operation (control instruction). The threat ID 1202 is an ID of the threat related to the corresponding control operation ID 1201. In the example of FIG. 12, a relationship between the control operation and the threat is managed by a pair of the control operation ID 1201 and the threat ID 1202. The control operation type 1203 is a type of the control operation. For example, in the STAMP/STPA, control operations are classified, and the same type can be used as the control operation type 1203. The start point device ID 1204 is an ID of a device that performs/transmits the corresponding control operation. The end point device ID 1205 is an ID of a device that receives the corresponding control operation. In the example of FIG. 12, a relationship between the device that performs the control operation and the device that receives the control operation is managed by a pair of the start point device ID 1204 and the end point device ID 1205. Note that if there is no device that is a target of the control operation, a method of managing by leaving the end point device ID blank is possible.

The other control operation information 1206 is information regarding the control operation such as a control operation name. For example, in the design using the STAMP/STPA, which is performed for the above-mentioned "railroad crossing control system", if there is obtained a design result indicating that a defect of a control operation (an "instruction to start obstacle detection" (a control operation ID "AC333") from the device name "railroad crossing controller" (the device ID "DEV111") to a device name "obstacle detector" (a device ID "DEV222") leads to a threat "collision with an automobile inside a railroad crossing" (a threat ID "T444"), in the present embodiment, a record is stored in which the control operation ID 1201 is set to "AC333", the threat ID 1202 is set to "T444", the start point device ID 1204 is set to "DEV111", the end point device ID 1205 is set to "DEV222", and the other control operation information 1206 is set to "instruction to start obstacle detection".

FIG. 13 is a diagram showing an example of the vulnerability/control operation correspondence table 805. In FIG. 13, the vulnerability/control operation correspondence table 805 has the vulnerability type 1301, the control operation type 1302, a control operation point 1303, and the vulnerability influence degree 1304 as data items.

The vulnerability type 1301 is a type of the vulnerability. The control operation type 1302 is a type of the control operation. In the example of FIG. 13, a relationship between the vulnerability and the control operation is managed for each type by a pair of the vulnerability type 1301 and the control operation type 1302. The control operation point 1303 is a binary value indicating whether the device where the vulnerability exists is at a start point or at an end point of the control operation. The vulnerability influence degree 1304 is a probability or a score of blockage of the control operation when the vulnerability is attacked. In the present embodiment, the vulnerability/control operation correspondence information is information defined in advance by an expert and stored before the threat analysis system 10 starts operating.

FIG. 14 is a diagram showing an example of the threat analysis result table 806. In FIG. 14, the threat analysis result table 806 has a device ID 1401, a vulnerability ID 1402, a vulnerability type 1403, a control operation ID list 1404, a control operation influence degree list 1405, a threat ID list 1406, and a threat influence degree list 1407, and system influence degree 1408 as data items.

The device ID 1401 is an identifier uniquely assigned to the device. The vulnerability ID 1402 is an ID of the vulnerability possessed by the device represented by the corresponding device ID 1401. In the example of FIG. 14, a pair of the device ID 1401 and the vulnerability ID 1402 associates the vulnerability detection result and the threat analysis result in the vulnerability detection result table 801 with each other, and the threat analysis result with respect to one vulnerability detected in one record is stored. The vulnerability type 1403 is a type of the vulnerability.

The control operation ID list 1404 is a list of control operation IDs related to the detected vulnerability. The control operation influence degree list 1405 is a list of probabilities or scores of the blockage of the control operations. In the control operation influence degree list 1405, the control operation influence degree corresponding to each of the control operations ID in the control operation ID list 1404 is listed. The threat ID list 1406 is a list of threat IDs related to the detected vulnerability. The threat influence degree list 1407 is a list of probabilities or scores of the occurrence of threats. The threat influence degree list 1407 lists the threat influence degree corresponding to each of the threat IDs in the threat ID list 1406. The system influence degree 1408 is an influence degree of the detected vulnerability on the entire system. In the present embodiment, the threat analysis server 105 stores, in the threat analysis result table 806, processing results from the threat analysis by the predetermined algorithm.

Note that while in the present embodiment, the vulnerability detection result table 801, the vulnerability information table 802, the threat information table from the viewpoint of the business operator 803, the control operation information table 804, the vulnerability/control operation correspondence table 805, and the threat analysis result table 806 are constructed on the database 107, they may be stored in the threat analysis server 105. Moreover, it may be one table resulting from combining at least any ones of the above-mentioned tables, or may be a more normalized table.

(Threat Analysis Method)

Hereinafter, an actual procedure of the threat analysis method in the present embodiment will be described with reference to the drawings. Various operations corresponding to the threat analysis method described below are realized by a program read and executed by, for example, the threat analysis server 105 to the memory 703 or the like, the threat analysis server configuring the threat analysis system 10. This program is configured of codes for performing various operations described below. Note that in the following description, not only processing executed by the threat analysis server 105, but also processing executed by the other devices will be described appropriately.

(Flow Related to Vulnerability Detection Processing)

Figure 15:
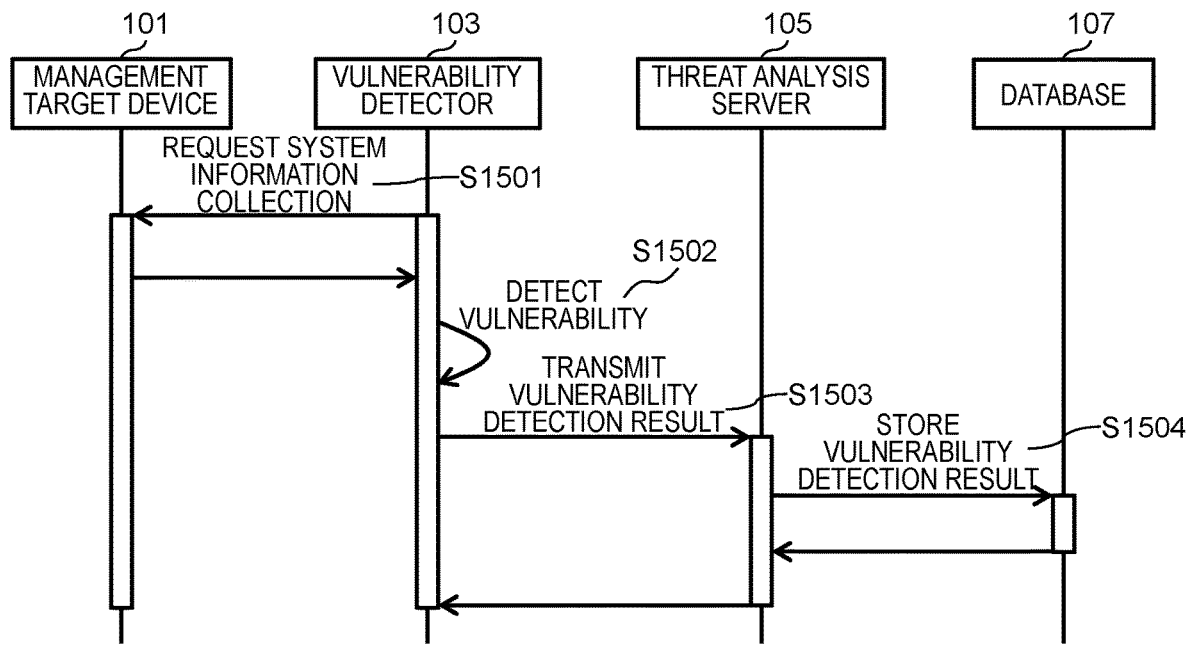
FIG. 15 is a diagram showing an example of a flow showing a processing procedure related to vulnerability detection processing according to the first embodiment.

FIG. 15 is a diagram showing an example of a flow showing a processing procedure related to the vulnerability detection processing in the present embodiment. Here, the vulnerability detection processing of the vulnerability detector 103 will be mainly described. Such processing needs to be executed in advance before (at least immediately before) the threat analysis processing is performed in the threat analysis server 105. In addition, since the system information (information obtained from the administration target device 101), the vulnerability information (information obtained from the vulnerability information disclosing organization 104), and the like are approximately subjected to addition, update, or the like in the administration target device 101 and the vulnerability information disclosing organization 104 or the like as needed, it is preferable that acquisition processing of these pieces of information is executed as processing of a background in the threat analysis system 10 (the administration target device 101, the vulnerability detector 103, or the threat analysis server 105 included in, or cooperates with the same system 10).

First, the system information collecting unit 303 of the vulnerability detector 103 requests the administration target device 101 to perform processing for collecting the system information. Upon receiving the request, the administration target device 101 activates the system information output unit 203, collects the system information by a standard function in its own OS, and transmits the resultant to the vulnerability detector 103 (step S1501).

Next, the vulnerability detection processing unit 304 in the vulnerability detector 103 detects the vulnerability possessed by the administration target device 101 on the basis of the system information (step S1502). As a method for detecting the vulnerability, a tool based on the inspection specification defined by the security inspection language (OVAL) may be used, and the form is not limited.

Next, the vulnerability detection result output unit 305 in the vulnerability detector 103 transmits the vulnerability detection result of the vulnerability detection processing unit 304 to the threat analysis server 105 via the transmission/reception unit 301 (step S1503).

Upon receiving the vulnerability detection result from the vulnerability detector 103, the vulnerability-detection result collecting unit 503 of the threat analysis server 105 adds the data to the vulnerability detection result table 801 of the database 107 (step S1504). In response to a request of the addition of the data, the database 107 searches the vulnerability detection result table 801 using, as a key, a pair of the device ID and the vulnerability ID included in the request, and if there is no record regarding the relevant device ID and the vulnerability ID, the database 107 newly generates a record and sets a value of the relevant item of the vulnerability detection result included in the request. In addition, in the database 107, if the record regarding the pair of the relevant device ID and the vulnerability ID has already existed in the vulnerability detection result table 801, the data update is performed, using the value of the relevant item of the vulnerability detection result included in the request in the relevant record. Update the data.

The above processing (steps S1501 to S1504) is executed for each of the administration target devices 101, and is repeated a number of times equal to a number of the administration target devices 101. In the present embodiment, a client-server configuration is employed between the administration target device 101 and the vulnerability detector 103, and the acquisition processing of the system information and the like is automated to make the operation more efficient.

However, the user who uses the client device 106 or the like may manually describe the system information of the administration target device 101 in a data file format and input this to the vulnerability detector 103. Manually inputting the system information by the user in this manner has an advantage that the administration target device 101 can be operated without an agent. Moreover, while in the present embodiment, the system information is regularly transmitted, a change in the system information may be detected and the same system information may be transmitted at timing when the system information changes.

(Flow Related to Vulnerability Information Acquisition Processing)

Processing for acquiring the vulnerability information from the vulnerability information disclosing organization 104 will be described with reference to FIG. 16.

Figure 16:
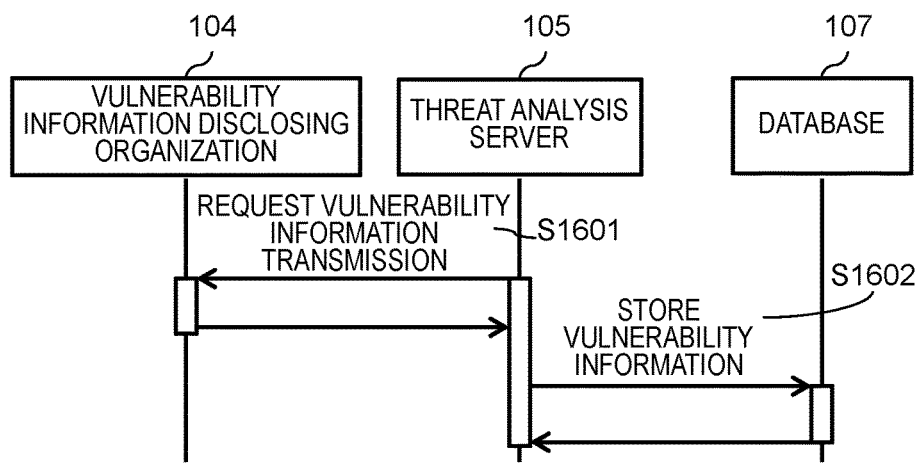
FIG. 16 is a diagram showing an example of a flow showing a processing procedure related to vulnerability information acquisition processing according to the first embodiment.

FIG. 16 is a diagram showing an example of a flow showing a processing procedure relating to vulnerability information acquisition processing in the present embodiment. In this case, first, the vulnerability information collecting unit 504 of the threat analysis server 105 requests the vulnerability information disclosing organization 104 to perform processing for transmitting the vulnerability information. Upon receiving the request, the vulnerability information disclosing organization 104, activates the vulnerability information output unit 403 and transmits the vulnerability information to the threat analysis server 105 (step S1601). Note that a method of exchanging the information between the vulnerability information disclosing organization 104 and the threat analysis server 105 is based on the specification of the vulnerability information disclosing organization 104.

Upon receiving the vulnerability information from the vulnerability information disclosing organization 104, the vulnerability information collecting unit 504 of the threat analysis server 105 adds the data to the vulnerability information table 802 of the database 107 (step S1602). In response to the request for adding the data, the database 107 searches the vulnerability information table 802, using the vulnerability ID included in the request as a key, and if there is no record regarding the relevant vulnerability ID, the database 107 newly generates a record, and sets a value of the relevant item in the included vulnerability information included in the request. In addition, if the record regarding the relevant vulnerability ID has already existed in the vulnerability information table 802, the database 107 updates the data in the relevant record, using a value of the relevant item in the vulnerability information included in the request.

In the present embodiment, the vulnerability information acquisition processing is automated between the vulnerability information disclosing organization 104 and the threat analysis server 105 to make the operation more efficient.

(Flow Related to Design Information Input Processing)

Processing in which the user inputs the design information via the client device 106 will be described with reference to FIG. 17

Figure 17:
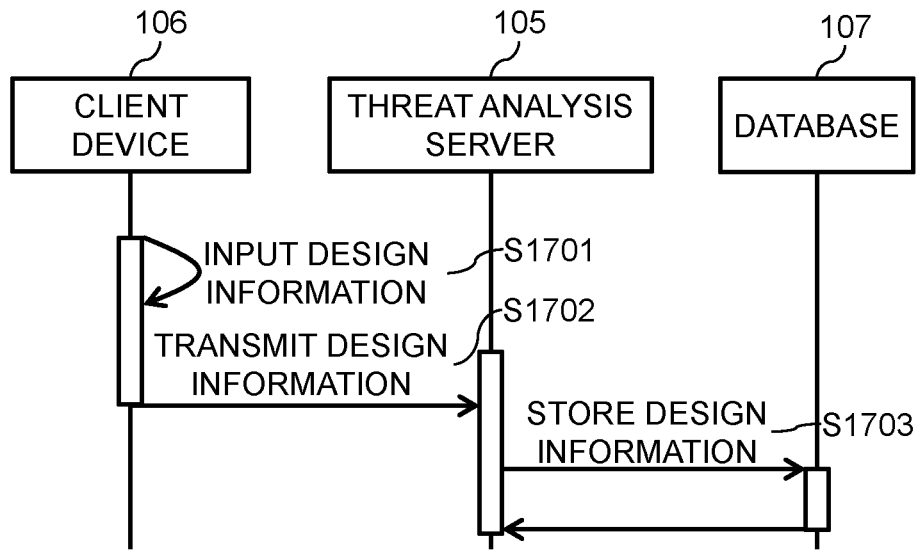
FIG. 17 is a diagram showing an example of a flow showing a processing procedure related to design information input processing according to the first embodiment.

FIG. 17 is a diagram showing an example of a flow showing a processing procedure related to design information input processing in the present embodiment. In this case, first, the design-information input screen display unit 604 of the client device 106 displays a screen for inputting the design information to the user via the input/output unit 602, and accepts an input of the design information (the threat information from the viewpoint of the business operator, the control operation information, and the like) (step S1701). Note that as a method for inputting the design information, a method of inputting the data in a form via GUI (Graphical User Interface), a method of reading the design information in a file format such as XML (Extensible Markup Language), and the like are enabled, and a form is not limited.

Next, the client device 106 transmits the design information to the threat analysis server 105 via the transmission/reception unit 601 (step S1702).

Upon receiving the design information from the client device 106, the design information collecting unit 505 of the threat analysis server 105 adds the data to the threat information table from the viewpoint of the business operator 803 and the control operation information table 804 of the database 107 (step S1703). In response to a request to add the data, the database 107 searches the threat information table from the viewpoint of the business operator 803, using the threat ID included in the request as a key, and if there is no record related to the relevant threat ID, newly generates a record and sets a value of the relevant item in the threat information from the viewpoint of the business operator included in the request. Moreover, if the record related to the relevant threat ID has already existed in the threat information table from viewpoint of the business operator 803, the database 107 updates the data in the relevant record, using a value of the relevant item in the threat information from the viewpoint of the business operator included in the request. In addition, in response to the request to add the data, the database 107 searches the control operation information table 804, using the control operation ID included in the request as a key, and if there is no record related to the relevant control operation ID, newly generates a record and sets a value of the relevant item in the control operation information included in the request. Moreover, if the record regarding the relevant control operation ID has already existed in the control operation information table 804, the database 107 updates the data in the relevant record, using a value of the relevant item in the control operation information included in the request.

(Flow Related to Threat Analysis Processing (Main Flow))

Next, processing of the threat analysis performed by the threat analysis server 105 will be described with reference to FIG. 18.

Figure 18:
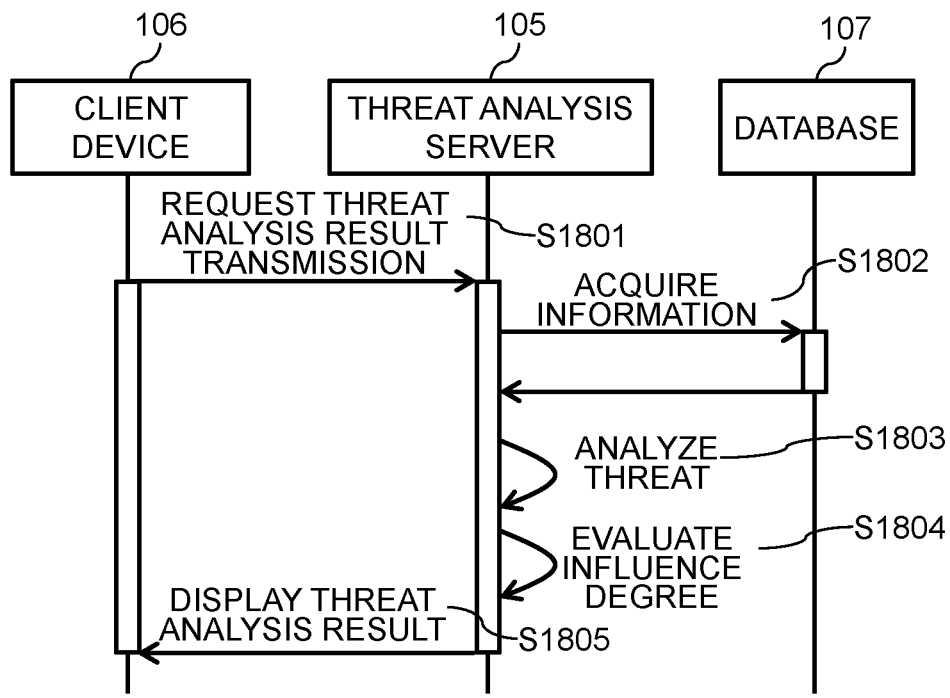
FIG. 18 is a diagram showing an example of a flow showing a processing procedure related to threat analysis processing according to the first embodiment.

FIG. 18 is a diagram showing an example of a flow showing a processing procedure related to the threat analysis processing in the present embodiment. In this case, first, the client device 106 accepts a request of the user via the input/output unit 602 and requests the threat analysis server 105 to perform the threat analysis processing (step S1801).

Upon receiving the request for the threat analysis processing from the client device 106, the threat analysis server 105 activates the threat analysis processing unit 506, and acquires the information from the vulnerability detection result table 801, the vulnerability information table 802, and the threat information table from the viewpoint of the business operator 803, the control operation information table 804, the vulnerability/control operation correspondence table 805, and the threat analysis result table 806 on the database 107 (step S1802). Note that while in the present embodiment, a form is employed in which the threat analysis server 105 collectively acquires the information necessary for the threat analysis processing in step S1802 and expands it on the memory 703, the database 107 may be accessed at timing when the information is required at each of the steps, and only the necessary information may be acquired.

Next, the threat analysis processing unit 506 of the threat analysis server 105 performs the threat analysis processing on the basis of the acquired information (step S1803). Here, the threat analysis processing (step S1803) will be described with reference to FIG. 19.

Figure 19:
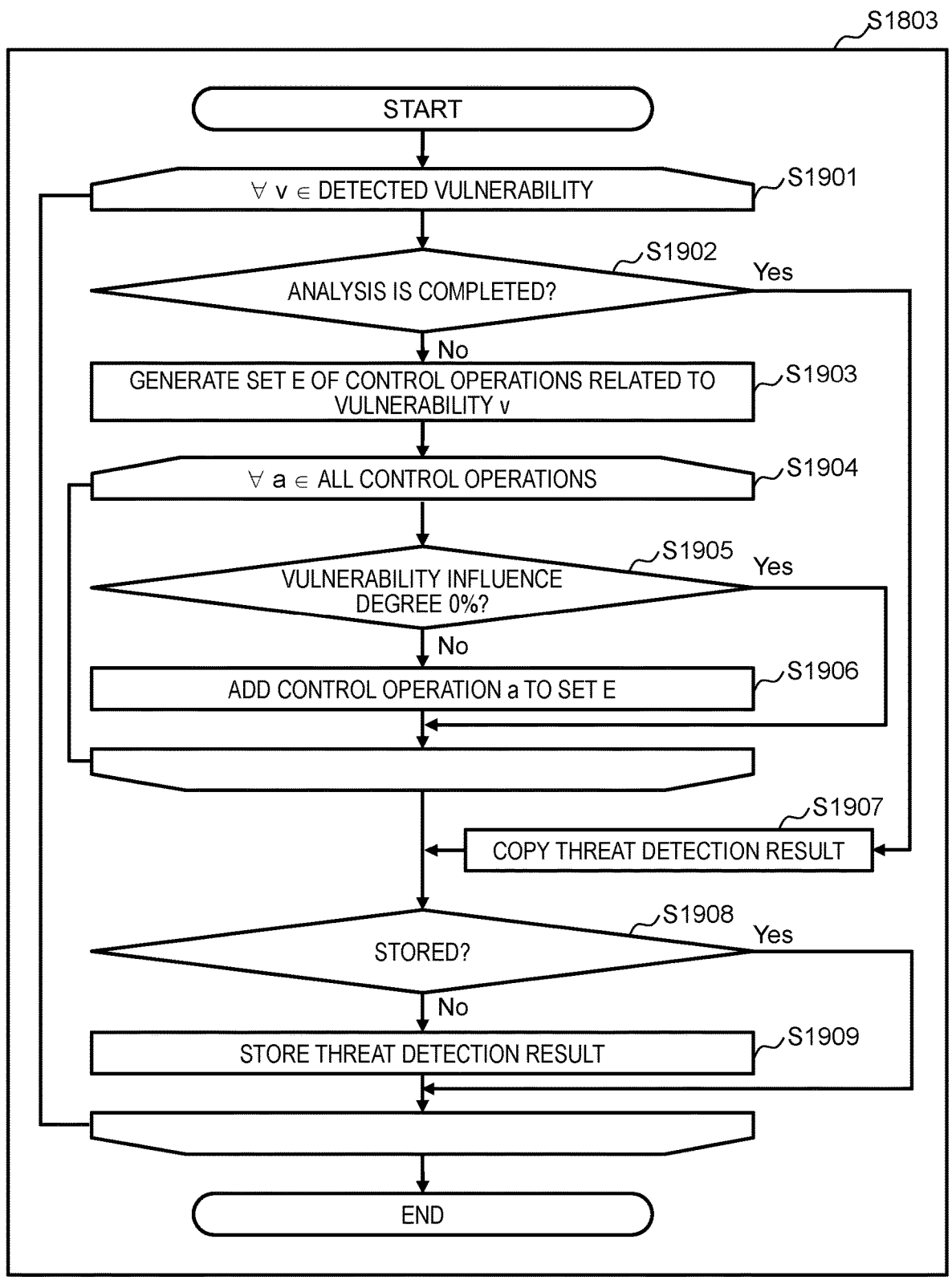
FIG. 19 is a diagram showing an example of a flowchart related to the threat analysis processing according to the first embodiment.

FIG. 19 is a diagram showing an example of a flowchart related to the threat analysis processing.

First, the threat analysis processing unit 506 performs the processing in steps S1902 to S1909 for all the detected vulnerabilities on the basis of the vulnerability detection result information of the vulnerability detection result table 801 (step S1901). Details of steps S1902 to S1909 will be described later.

In step S1902, the threat analysis processing unit 506 determines presence or absence of a threat analysis result in which the device possessing the detected vulnerability matches the type of the relevant vulnerability. The threat analysis processing unit 506 searches the vulnerability information table 802, using, as a key, the vulnerability ID included in the vulnerability detection result information, and acquires the vulnerability type related to the relevant vulnerability ID. Moreover, the threat analysis processing unit 506 searches the threat analysis result table 806, using, as a key, a pair of the device ID included in the vulnerability detection result information, and the relevant vulnerability type, and if it is determined that there is no record regarding the pair of the relevant device ID and the vulnerability type, the processing in steps S1903 to S1906 is performed. On the other hand, if the threat analysis processing unit 506 determines that the record related to the pair of the relevant device ID and the vulnerability type has already existed in the threat analysis result table 806, the threat analysis processing unit 506 performs processing in step S1907. In the present embodiment, the threat analysis result information is stored in the database 107 in association with the device ID and the vulnerability type, and the presence or absence of the vulnerability detection result is determined in the processing in step S1902, by which the processing in steps S1903 to S1906 can be omitted, so that a calculation amount of the threat analysis processing is reduced. Note that, although details of steps S1903 to S1906 will be described later, if the device possessing the detected vulnerability and the type of the relevant vulnerability match, the processing in steps S1903 to S1906 is processing in which the same result is obtained. Details of step S1907 will also be described later.

Next, if it is determined that there is no related threat detection result in the processing in step S1902, the threat analysis processing unit 506 generates a set of control operations related to the detected vulnerability (step S1903). The relevant set is first generated as an empty set, and control operations related to the vulnerabilities detected in the processing in steps S1904 to S1906 are added.

Next, the threat analysis processing unit 506 performs the processing in steps S1905 and S1906 for all the control operations on the basis of the control operation information in the control operation information table 804 (step S1904).

In step S1905, the threat analysis processing unit 506 determines the presence or absence of a relationship between the detected vulnerability and the control operation. The threat analysis processing unit 506 determines whether or not the device ID included in the vulnerability detection result information and the start point device ID or the end point device ID included in the control operation information match, and if the relevant device ID does not match the relevant start point device ID or the relevant end point device ID, step S1905 ends and step S1906 is omitted. If the threat analysis processing unit 506 determines that the relevant device ID matches the relevant start point device ID, the threat analysis processing unit 506 sets the control operation point to the "start point". If the threat analysis processing unit 506 determines that the relevant device ID matches the relevant end point device ID, the threat analysis processing unit 506 sets the control operation point to the "end point". Note that the control operation point means whether the device having the vulnerability is at the start point or the end point of the control operation as described above. Moreover, the threat analysis processing unit 506 searches the vulnerability information table 802, using the vulnerability ID included in the vulnerability detection result information as a key, and acquires the vulnerability type related to the relevant vulnerability ID. Moreover, the threat analysis processing unit 506 searches the vulnerability/control operation correspondence table 805, using, as a key, the set of the relevant vulnerability type, the control operation type included in the control operation information, and the relevant control operation point, and acquires the vulnerability influence degree regarding a group of the relevant vulnerability type, the control operation type, and the control operation point, and if it is determined that the acquired vulnerability influence degree is "0%", step S1906 is omitted. If the threat analysis processing unit 506 determines that the vulnerability influence degree is higher than "0%", the threat analysis processing unit 506 performs step S1906.

Next, if the threat analysis processing unit 506 determines in the processing in step S1905 that there is a relationship between the detected vulnerability and the control operation, the relevant control operation is added to the set of control operations related to the detected vulnerabilities.

On the other hand, when the threat analysis processing unit 506 determines in the processing of step S1902 that there is a related threat detection result, the threat analysis processing unit 506 acquires the set of control operations included in the relevant threat detection result, and copies the set (step S1907).

Next, the threat analysis processing unit 506 determines whether or not the threat analysis result corresponding to the vulnerability detection result has been stored (step S1908). The threat analysis processing unit 506 searches the threat analysis result table 806, using, as a key, the pair of the device ID and the relevant vulnerability ID included in the vulnerability detection result, and if it is determined that there is no record related to the pair of the relevant device ID and vulnerability ID, newly generates a record, and sets a value of the relevant item in the set of control operations related to the vulnerability detection result information and the vulnerability (step S1909). Note that for the control operation influence degree list 1405, the threat influence degree list 1407, and the system influence degree 1408, values calculated by influence evaluation processing shown in FIG. 20 are stored. In addition, if the threat analysis processing unit 506 determines that the record regarding the pair of the relevant device ID and vulnerability ID has already existed in the threat analysis result table 806, the processing in step S1909 is omitted.

The threat analysis processing (step S1803) is realized by the processing in steps S1901 to S1909 described above.

Here, description will be returned to the flow in FIG. 18. After the threat analysis processing (step S1803) is completed, the threat analysis server 105 performs the influence degree evaluation processing (step S1804).

The influence degree evaluation processing (step S1804) will be described with reference to FIG. 20. Note that in the Bayesian network, since an arbitrary object is a node and probability calculation is executed, using a graph connected by a unidirectional arrow called an arc indicating a parentchild relationship of nodes, for the sake of explanation, a Bayesian network graph model 2101 illustrated in FIG. 21 will be referred to as needed.

Figure 20:
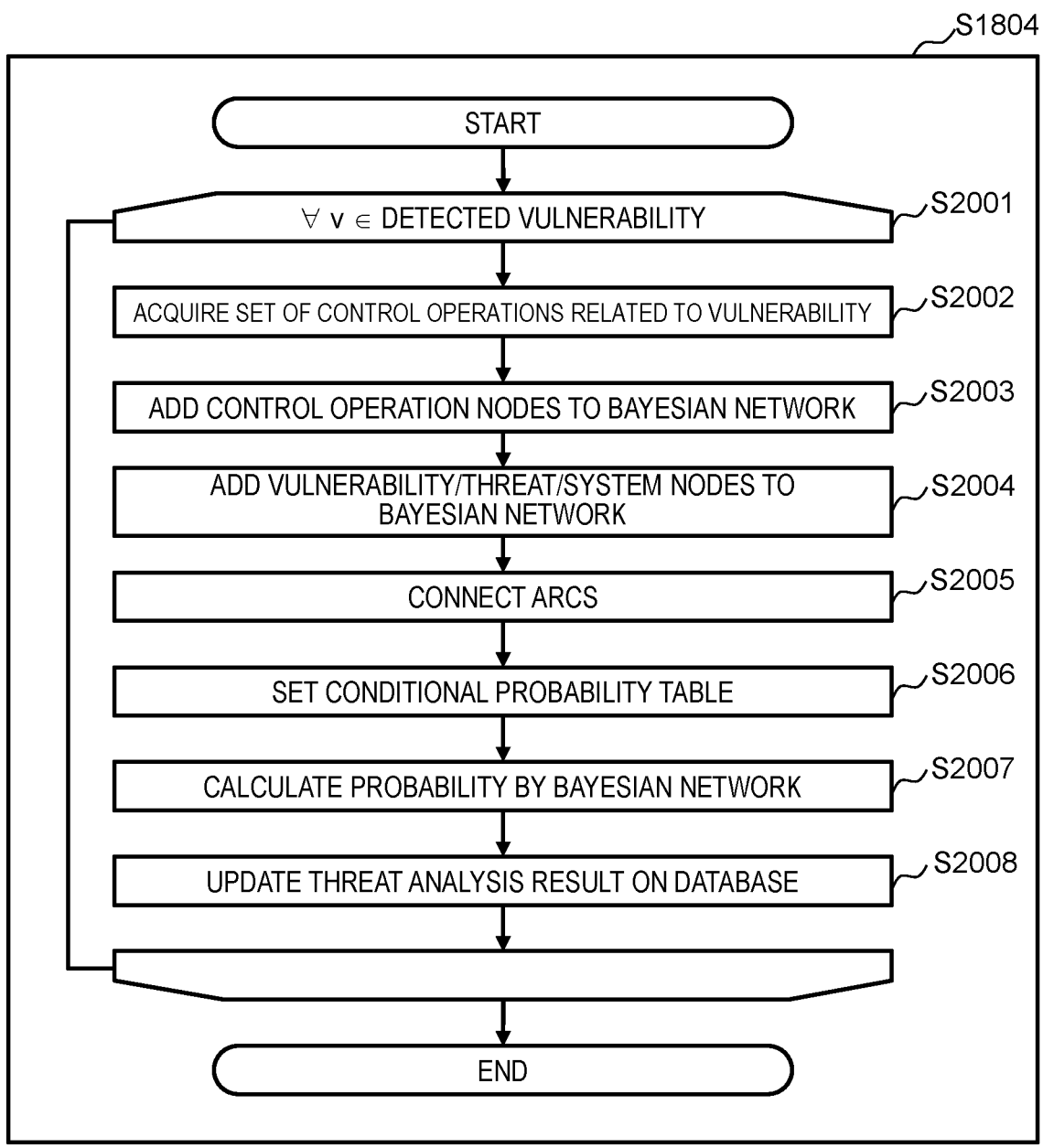
FIG. 20 is a diagram showing an example of a flowchart related to an influence degree evaluation processing according to the first embodiment.

FIG. 20 is a diagram showing an example of a flowchart related to the influence degree evaluation processing.

First, the influence-degree evaluation processing unit 507 performs processing in steps S2002 to S2008 for all the detected vulnerabilities on the basis of the vulnerability detection result information of the vulnerability detection result table 801 (step S2001). Details of steps S2002 to S2008 will be described later.

Next, the influence-degree evaluation processing unit 507 acquires the set of the control operations related to vulnerability (step S2002). The influence-degree evaluation processing unit 507 searches the threat analysis result table 806, using, as a key, the pair of the device ID and the vulnerability ID included in the vulnerability detection result information, and acquires the set of the control operations related to the relevant pair of the device ID and vulnerability ID.

Figure 21:
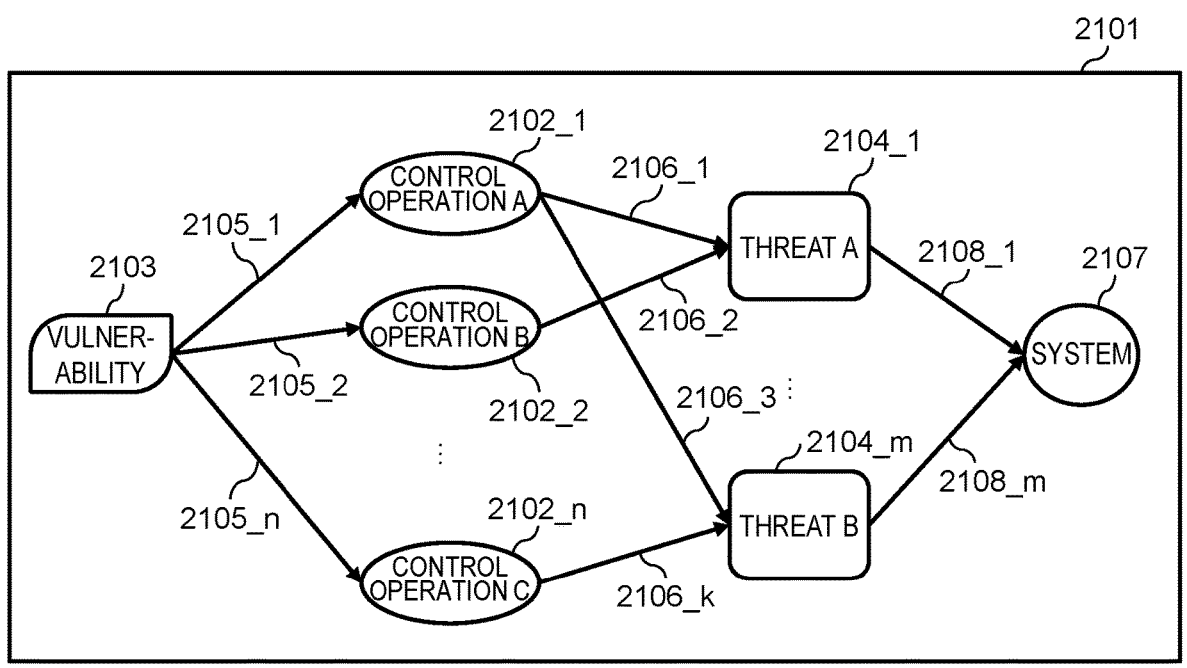
FIG. 21 is a diagram showing an example of a Bayesian network model according to the first embodiment.

Next, the influence-degree evaluation processing unit 507 adds control operation nodes to the Bayesian network (step S2003). The influence-degree evaluation processing unit 507 adds the control operations included in the set of control operations as the nodes of the Bayesian network. However, duplicate control operations that have already been added will not be added. The example of the Bayesian network model of FIG. 21 is in a state where all control operation nodes 2102 (control operation nodes 2102_1 to 2102_n) are added.

Next, the influence-degree evaluation processing unit 507 adds a vulnerability node, threat nodes, and a system node to the Bayesian network (step S2004). The influence-degree evaluation processing unit 507 adds the vulnerability corresponding to the vulnerability ID included in the vulnerability detection result information as the node of the Bayesian network. The example of the Bayesian network model of FIG. 21 is in a state where one vulnerability node 2103 is added. Moreover, the control operation information table 804 is searched, using, as keys, the control operations ID included in the set of the control operations, the threats ID related to the relevant control operations ID are acquired, and the threats corresponding to the relevant threats ID are added as the nodes of the Bayesian network. The example of the Bayesian network model of FIG. 21 is in a state where all threat nodes 2104 (threat nodes 2104_1 to 2104_m) are added. Moreover, the influence-degree evaluation processing unit 507 adds the threat analysis target system as the node of the Bayesian network. The example of the Bayesian network model of FIG. 21 is in a state where one system node 2107 is added.

Next, the influence-degree evaluation processing unit 507 connects the arcs between the nodes (step S2005). The influence-degree evaluation processing unit 507 connects unidirectional arcs from the vulnerability node to all the control operation nodes. The example of the Bayesian network model of FIG. 21 is in a state where all arcs 2105 (arcs 2105_1 to 2105_n) from the vulnerability node 2103 to the control operation nodes 2102 are connected. Moreover, the influence-degree evaluation processing unit 507 connects unidirectional arcs from the related control operation nodes to the threat nodes on the basis of the relationships between the control operations ID and the threats ID included in the control operation information. The example of the Bayesian network model of FIG. 21 is in a state where all arcs 2106 (arcs 2106_1 to 2106_k) from the control operation nodes 2102 to the threat nodes 2104 are connected. In addition, the influence-degree evaluation processing unit 507 connects unidirectional arcs from all the threat nodes to the system node. The example of the Bayesian network model of FIG. 21 is in a state where all arcs 2108 (arcs 2108_1 to 2108_m) from the threat nodes 2104 to the system node 2107 are connected.

Next, the influence-degree evaluation processing unit 507 sets a conditional probability table showing parameters of the Bayesian network (step S2006). In the present embodiment, the influence-degree evaluation processing unit 507 sets parameters on the basis of the attack easiness 1003 included in the vulnerability information table 802, and the vulnerability influence degree 1304 of the vulnerability/control operation correspondence table 805.

Next, the influence-degree evaluation processing unit 507 calculates the probability, using the Bayesian network (step S2007). As a probability calculation method, a probability propagation method or the like can be used, and a form is not limited. In the present embodiment, the influence-degree evaluation processing unit 507 uses a marginal probability of each of the control operation nodes calculated by the Bayesian network as a control operation influence degree, a marginal probability of each of the threat nodes as the threat influence degree, and the marginal probability of the system node as a system influence degree. Note that a system influence degree may be a weighted average evaluation of the threat influence degrees.

Next, the influence-degree evaluation processing unit 507 stores the processing result of the influence-degree evaluation processing unit 507 in the database 107 (step S2008). The influence-degree evaluation processing unit 507 searches the threat analysis result table 806, using, as a key, the pair of the device ID and the vulnerability ID included in the vulnerability detection result information, and updates the data by a value of the relevant item in the processing result of the influence-degree evaluation processing unit 507 in a record relating to the pair of the relevant device ID and vulnerability ID.

The influence degree evaluation processing is realized by the processes in steps S2001 to S2008 described above.

Here, description will be returned to the flow in FIG. 18. The threat analysis server 105 activates the threat-analysis result output unit 508 after the end of the influence degree evaluation processing (step S1804), and transmits the threat analysis result to the threat-analysis result collecting unit 606 of the client device 106 via the transmission/reception unit 501 (step S1805).

Upon accepting the threat analysis result, the client device 106 activates the threat-analysis result screen display unit 607, and displays the threat analysis result screen to the user via the input/output unit 602.

Figure 22:
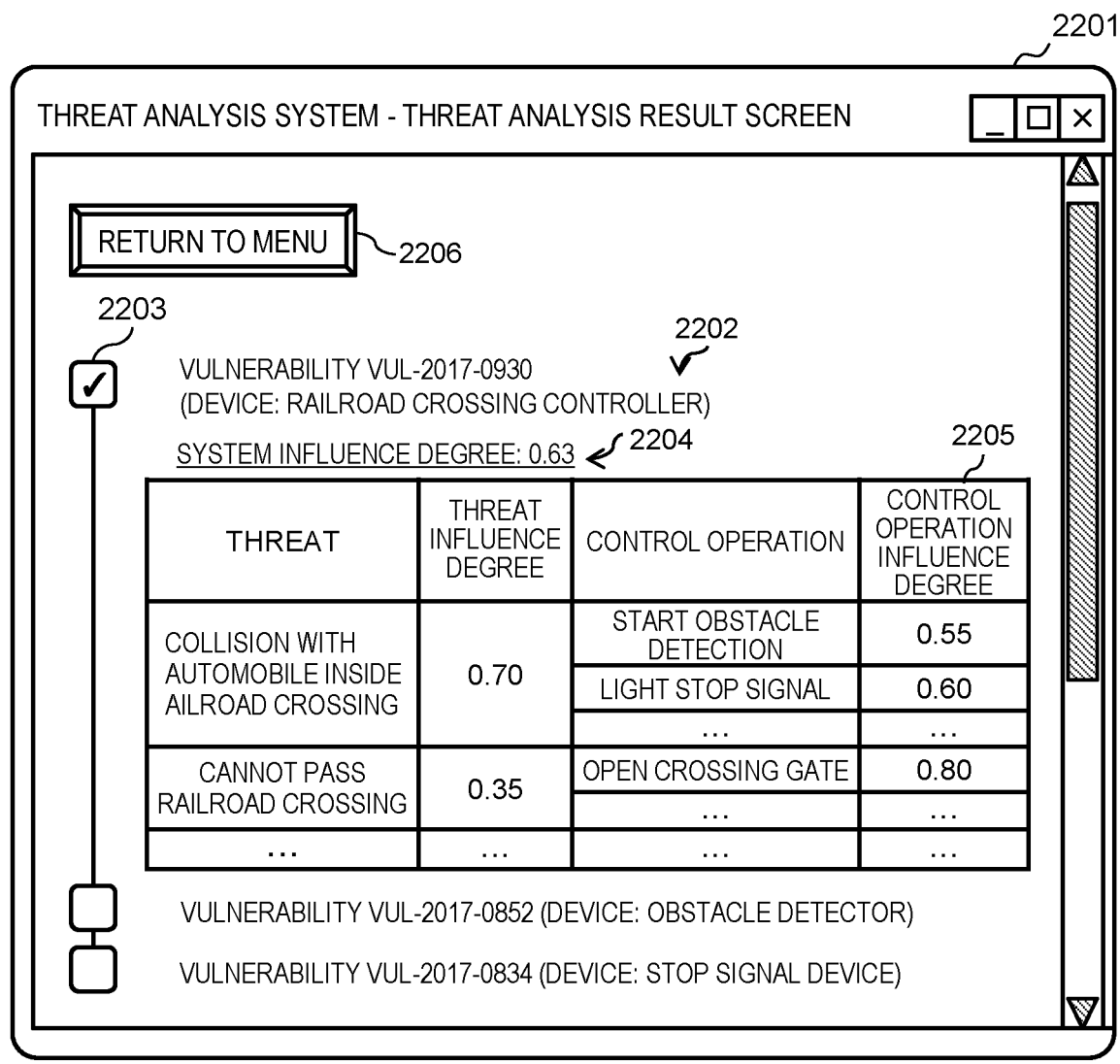
FIG. 22 is a diagram showing an example of a threat analysis result screen according to the first embodiment.

FIG. 22 is a diagram showing an example of the threat analysis result screen. In the present embodiment, a list of the detected vulnerabilities is displayed in a first display area 2202 of a threat analysis result screen 2201 on the basis of the vulnerability detection result information in the vulnerability detection result table 801. In the first display area 2202, the vulnerabilities ID included in the vulnerability detection result information, other device information, and the like are displayed.

Next, the threat analysis result screen 2201 includes check boxes 2203 for selecting the detected vulnerability. As a method for selecting the vulnerability, pull-down, keyword input in a form, or the like can be used, and a form is not limited.

Next, in a second display area 2204 of the threat analysis result screen 2201, the system influence degree of the selected vulnerability is displayed on the basis of the threat analysis result information of the threat analysis result table 806.

Next, in a third display area 2205 of the threat analysis result screen 2201, the control operation related to the selected vulnerability, the control operation influence degree of the same, the threat, and the threat influence degree of the same are displayed in a table on the basis of the threat analysis result information of the threat analysis result table 806. In the present embodiment, the detected vulnerability is selected and only the threat analysis result related to the relevant vulnerability is displayed, thereby enabling efficient display on a screen having a limited size. All the threat analysis results may be listed and displayed without selecting the vulnerability.

Next, the threat analysis result screen 2201 includes a button 2206 for transitioning to a design information input screen.

As described above, by analyzing the relationship between the vulnerability and the threat, the result from analyzing the threat for each of the devices can be converted to the threat analysis from the viewpoint of the business operator on the basis of safety design information manually performed in advance. Moreover, by displaying the threat analysis result screen 2201 on the client device 106, a user or the like who browses the screen can quickly grasp, for example, the threat from the viewpoint of the business operator that the vulnerability may cause, and the magnitude of the influence, can easily grasp whether the current system has satisfied the security requirement, and can determine the priority of vulnerabilities to be dealt with.

(2) Other Embodiments

While in the above-described embodiment, the case where the present invention is applied to the threat analysis system 10 has been described, the present invention is not limited to this, and is widely applied to various other analysis systems, analysis methods, and the like.

Moreover, while in the above-described embodiment, the case where the threat analysis result screen (threat analysis result including the relationship between the associated vulnerability and threat) and the like as shown in FIG. 22 is displayed has been described, the present invention is not limited thereto, and as the method of outputting the threat analysis result, for example, methods of printing on a medium such as paper, transmitting by e-mail to a predetermined mail address, or storing in an external storage may be employed.

In addition, the configuration described above may be appropriately changed, rearranged, combined, or omitted without departing from the scope of the gist of the present invention. For example, the vulnerability included in the device and the threat in the threat analysis target system may be associated with each other, and a relationship between the associated vulnerability and threat may be output, or the vulnerability included in the device, the threat in the threat analysis target system, and the control operation related to the device may be associated with one another, and a relationship among the associated vulnerability, threat, and control operation may be output. Moreover, for example, the magnitude of the influence of the vulnerability included in the device on the threat in the threat analysis target system may be evaluated, using a predetermined algorithm (e.g., Bayesian network), or the magnitude of the influence of the vulnerability included in the device on the threat in the threat analysis target system, or a magnitude of the influence of the vulnerability included in the device on the control operation related to the device may be evaluated, using a predetermined algorithm (e.g., Bayesian network). The evaluation result may be output, or may be used for internal processing (e.g., control in display order) or the like without being output.

Note that the present invention is not limited to the above-described embodiments, but includes various modifications. For example, the above-described embodiments have been described in detail in order to describe the present invention in an easy-to-understand manner, and are not necessarily limited to those having all the configurations described. Moreover, a part of the configuration of one embodiment can be replaced with a configuration of another embodiment, and the configuration of one embodiment can be added to a configuration of another embodiment. Moreover, for a part of the configuration of each of the embodiment, addition, deletion, or replacement of another configuration can be made.

Moreover, each of the above-described configurations, the functions, the processing units, the processing means, and the like may be realized by hardware by designing a part or all of them, for example, as an integrated circuit, or the like. Moreover, each of the above-described configurations, functions, and the like may be realized by software by a processor interpreting and executing a program that realizes each of the functions. Information such as a program, a table, and a file for realizing each of the functions can be stored in a memory, a recording device such as a hard disk and SSD (Solid State Drive), or a recording medium such as an IC card, an SD card, and a DVD.

In addition, control lines and information lines considered to be necessary for the description are shown, and not all control lines and information lines in the product are necessarily shown. In fact, it can be considered that almost all the configurations are connected to one another.

While the best mode for carrying out the present invention, and the like have been specifically described above, the present invention is not limited to this, and various modifications can be made without departing from the scope of the gist of the invention.

According to the present embodiments described above, in addition to the vulnerability information and the information of the threat of each of the devices caused by the vulnerability, the relationship between the vulnerability and the threat from the viewpoint of the business operator is analyzed, which enables the threat analysis more suitable for the system security requirement.

Therefore, a priority of vulnerability countermeasures can be presented in an easy-to-understand manner to a system administrator of a company operating a system and an engineer (SE) who has developed a business system while considering the threats at the time of design with respect to the relationship between the vulnerability and the threat from the viewpoint of the business operator, so that determination of necessity and importance of vulnerability countermeasures by the user can be assisted.

REFERENE SIGNS LIST

10 threat analysis system
101 administration target device
102 network
103 vulnerability detector
104 vulnerability information disclosing organization
105 threat analysis server
106 client device
107 database

The invention claimed is:

1. A threat analysis system comprising:
a storage unit that stores first information in which a device configuring a threat analysis target system and a vulnerability included in the device are associated with each other, and second information in which the device and a threat from a viewpoint of a business operator assumed in the threat analysis target system are associated with each other;
a threat analysis processing unit that associates the vulnerability included in the device and a threat in the threat analysis target system with each other on a basis of the first information and the second information stored in the storage unit; and
a threat-analysis result output unit that outputs a relationship between the vulnerability and the threat associated by the threat analysis processing unit.

2. The threat analysis system according to claim 1,
wherein in the storage unit, third information is further stored in which a type of the vulnerability included in the device, a type of a control operation related to the device, and a vulnerability influence degree of the vulnerability on the control operation are associated with one another,
the threat analysis processing unit further associates the control operation having the vulnerability influence degree of a predetermined value corresponding to the type of the vulnerability included in the device and the type of the control operation related to the device on the basis of the third information stored in the storage unit, and
the threat-analysis result output unit outputs a relationship among the vulnerability, the threat, and the control operation associated by the threat analysis processing unit.

3. The threat analysis system according to claim 2
wherein in the threat analysis processing unit,
the information of the control operation associated with, and related to the device and the type of the vulnerability included in the device is stored in the storage unit, and
in the association of the control operation, when the information of the control operation associated with the device and the type of the vulnerability included in the device exists in the storage unit, the information of the control operation stored in the storage unit is used.

4. The threat analysis system according to claim 1, further comprising an influence-degree evaluation processing unit that evaluates a magnitude of an influence of the vulnerability included in the device on the threat in the threat analysis target system, using a predetermined algorithm.

5. The threat analysis system according to claim 4,
wherein the influence-degree evaluation processing unit uses a Bayesian network with the vulnerability included in the device, the control operation related to the device, and the threat in the threat analysis target system as nodes to evaluate the magnitude of the influence of the vulnerability included in the device on the threat in the threat analysis target system, and a magnitude of an influence of the vulnerability included in the device on the control operation related to the device, and
the threat-analysis result output unit outputs a result from the evaluation by the influence degree evaluation processing unit.

6. A threat analysis method in a threat analysis system having a storage unit that stores first information in which a device configuring a threat analysis target system and a vulnerability included in the device are associated with each other, and second information in which the device and a threat from a viewpoint of a business operator assumed in the threat analysis target system are associated with each other, the analysis method comprising:
a first step in which a threat analysis processing unit associates the vulnerability included in the device and a threat in the threat analysis target system with each other on a basis of the first information and the second information stored in the storage unit; and
a second step in which a threat-analysis result output unit outputs a relationship between the vulnerability and the threat associated by the threat analysis processing unit.

* * * * *